United States Patent (10) Patent No.: US 8,588,132 B1
Paczkowski et al. (45) Date of Patent: Nov. 19, 2013

(54) ENHANCING WIRELESS TELECOMMUNICATIONS SERVICES ON-SITE

(75) Inventors: Lyle W. Paczkowski, Mission Hills, KS (US); Mitchell D. Rice, Kansas City, KS (US); Pallavur Sankanranaraynan, Overland Park, KS (US); Jay D. Bluhm, Lenexa, KS (US); Stevan Klesper, Gardner, KS (US); Leo Michael McRoberts, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1108 days.

(21) Appl. No.: 11/837,039

(22) Filed: Aug. 10, 2007

(51) Int. Cl.
*H04Q 7/00* (2006.01)
(52) U.S. Cl.
USPC .......................................... 370/328; 370/352
(58) Field of Classification Search
USPC ......... 370/328, 338, 352, 353, 354, 355, 356, 370/401
See application file for complete search history.

(56) References Cited

U.S. PATENT DOCUMENTS

| | | | | |
|---|---|---|---|---|
| 5,862,317 A * | 1/1999 | Taki et al. | ...................... | 714/18 |
| 6,947,725 B2 * | 9/2005 | Aura | .............................. | 455/410 |
| 7,039,431 B2 * | 5/2006 | Mukherjee | ..................... | 455/461 |
| 7,177,636 B2 * | 2/2007 | Oda et al. | .................... | 455/426.1 |
| 7,477,602 B2 * | 1/2009 | Ling et al. | ..................... | 370/232 |
| 7,623,852 B2 * | 11/2009 | Gnuschke | ...................... | 455/419 |
| 7,672,317 B2 * | 3/2010 | Gateva et al. | ................ | 370/401 |
| 2004/0078626 A1 * | 4/2004 | Li | .................................... | 714/4 |
| 2007/0167175 A1 * | 7/2007 | Wong et al. | ............... | 455/456.5 |
| 2007/0242738 A1 * | 10/2007 | Park et al. | ...................... | 375/224 |
| 2008/0137609 A1 * | 6/2008 | Pan et al. | ........................ | 370/328 |
| 2008/0304441 A1 * | 12/2008 | Tsirtsis et al. | ................ | 370/328 |

\* cited by examiner

*Primary Examiner* — Ricky Ngo
*Assistant Examiner* — Christine Ng

(57) ABSTRACT

Methods and media are provided for offering telecommunications features to wireless devices through the use of a wireless exchange unit. The wireless exchange unit serves as an access point onto a larger wireless telecommunications network through use of a high-speed internet connection. The wireless exchange unit includes an access point base transceiver station (BTS) and an integrated application server. The integrated application server includes a session proxy, a home application server, and a voice application server. The wireless devices can access features such as, among other things, reduced-digit dialing, call rollover, and alternate message notification. For connections between devices local to the wireless exchange unit, the larger telecommunications network resources need not be utilized, therefore reducing congestion and improving performance. If used in conjunction with a network application server on the larger telecommunications network, the enhanced features can be offered to associated wireless devices when the devices are not local to the wireless exchange unit through access at another point of the telecommunications network.

17 Claims, 4 Drawing Sheets

ENHANCING WIRELESS TELECOMMUNICATIONS SERVICES ON-SITE

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention is defined by the claims below, but summarily, embodiments of the present invention enhance call features within a group of associated wireless devices. A system using computer-readable media provides, among other things, enhanced telecommunications functions to one or more wireless access devices through a wireless exchange unit. The unit includes an access point base transceiver station (BTS) and an integrated application server.

The present invention has several practical applications in the technical arts including providing small businesses, homes, and any other location with call features that normally require a wired-access point to provide. Embodiments also reduce wireless network congestion. This is done through the conversion of protocol-specific signals used by wireless devices, such as Code Division Multiple Access (CDMA) protocol, into a form that an application server can interpret. Converted signals may use, for example, Session Initiation Protocol (SIP), Time Division Multiple Access (TDMA), or Internet Protocol Private Branch Exchange (IPPBX). By using the wireless exchange unit, wireless devices can access high-speed wired networks to handle the backhaul needs of the signal transport.

In a first aspect, a set of computer-useable instructions provides a method of improving communication between a telecommunications network and one or more wireless devices. The method is carried out by utilizing a wireless exchange unit that includes an access-point base transceiver station ("BTS") and an integrated server. The wireless exchange unit operates as an access point to the telecommunications network and the wireless devices that are capable of communicating with the unit. The wireless devices are authenticated to the telecommunications network so that that the devices can communicate data via the network. A session is established between the wireless exchange unit and the wireless devices. The wireless exchange unit and the telecommunications network are logically coupled via a high-speed Internet connection. An enhanced network connection is provided to the wireless devices by way of the logical coupling and offers features that would not be available if a connection between the exchange unit and the wireless devices was not available.

In a second aspect, a set of computer-useable instructions provides a method of coupling wireless access terminals to a wireless exchange unit. The unit includes an access point base transceiver station (BTS) and an integrated server. The integrated server further includes a session proxy, a home application server and a voice application server. The wireless exchange unit operates as an access point to a telecommunications network for wireless access terminals capable of communicating wirelessly with the unit. The method includes providing an activity request from a wireless access terminal to a receiving component of the access point BTS. That activity request is forwarded to a session proxy, which in turn provides information associated with the wireless access terminal to an authentication component. The wireless terminal is authenticated based upon the information provided by the session proxy. The session proxy presents requests to the voice application server for enhanced communication features, which are features that would not be available if the wireless access terminal is unable to couple to the wireless exchange unit. The voice application server confirms that the wireless access terminal is authorized to request the features, and the home application server delivers the requested features to the wireless access terminal.

In a third aspect, a set of computer-useable instructions provides a method of improving communication between a network and wireless devices and is performed by utilizing a wireless exchange unit that also includes an access-point base transceiver station ("BTS") and an integrated server with an application server and a voice application server. The wireless exchange unit operates as an access point to the network and one or more wireless devices are capable of wirelessly communicating with the unit. The method includes providing respective unique identifiers associated with the wireless devices to the wireless exchange unit so that the devices are authorized to wirelessly communicate with the unit. A signal indicating that the wireless exchange unit is capable of wirelessly communicating with the devices is transmitted from the wireless exchange unit. A request for connection features is communicated from the voice application server of the wireless exchange unit to a server capable of providing the connection features. Finally, the wireless exchange unit is communicatively coupled to the network via a high-speed Internet connection.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
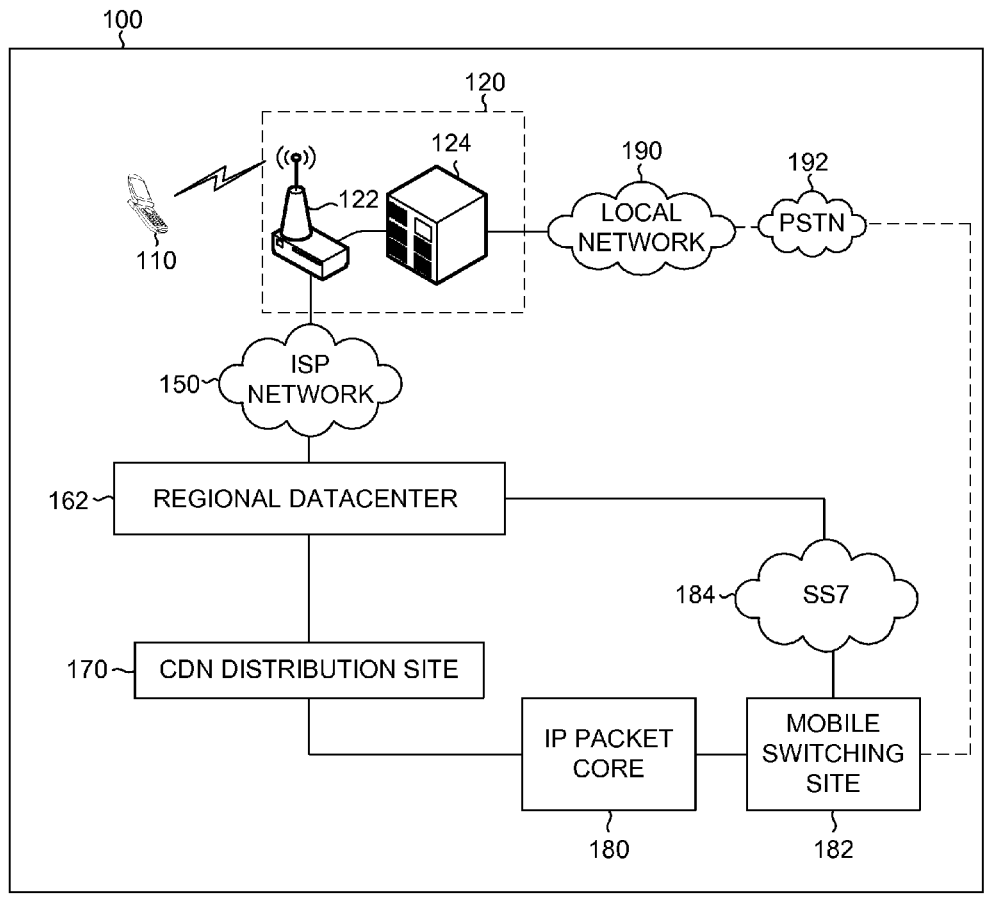
FIG. 1 is a simplified view of an exemplary wireless telecommunications environment suitable for practicing an embodiment of the present invention.

Embodiments of the present invention provide media and methods for associating a group of wireless devices with a wireless exchange unit in order to enhance the telecommunications features available to devices in the group. Features normally reserved for wired devices, such as three-, four- or five-digit dialing, call forwarding, and message notification can be provided to the group of wireless devices. These features typically require TDMA, SIP, or IPPBX compliant devices, which prevents most wireless devices from accessing the features. By providing CDMA compliant devices, or those that use similar protocols lacking compatibility with components offering these features, functions previously unavailable are now open to wireless devices.

Additionally, devices can receive improved wireless-device reception in an environment that normally is not conducive to traditional BTS reception through the wireless exchange unit and a high-speed internet connection. The wireless exchange unit acts as a node on the wireless telecommunications network but is capable of processing calls among associated devices without loading network resources further. This minimizes congestion and prevents calls from one local device to another local device from needlessly being routed to network components tens, hundreds, or thousands of miles away.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 1 × RTT | 1 times Radio Transmission Technology |
| AS | Application Server |
| BTS | Base Transceiver Station |
| CDMA | Code Division Multiple Access |
| CDN | Call Distribution Network |
| EVDOa | Evolution-Data Optimized revision A |
| IP | Internet Protocol |
| ISP | Internet Service Provider |
| LAN | Local Area Network |
| MSC | Mobile Switching |
| PBX | Private Branch Exchange |
| PSTN | Public Switched Telephone Network |
| SIP | Session Initiation Protocol |
| SS7 | Switching System 7 |
| TDMA | Time Division Multiple Access |
| VAS | Voice Application Server |
| VoIP | Voice over Internet Protocol |

Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

FIG. 1 depicts an illustrative operating environment 100 suitable for practicing an embodiment of the invention. Environment 100 has one or more wireless devices 110 that can communicate wirelessly with a wireless exchange unit 120. While only one wireless device 110 is shown for the sake of ease, more than one device can and likely will be used in practicing the present invention so as to maximize the benefits of the claimed embodiments of the present invention. Interaction with a single device or a multiplicity will be used interchangeably and simply by reference numeral 110.

In the exemplary environment, wireless device 110 is a one times radio transmission technology (1xRTT) compatible device or equivalent, meaning it can communicate using a protocol such as CDMA2000 or equivalent. Devices that will operate over second generation, third generation etc., or other wireless protocols are contemplated within the scope of the invention. Wireless devices that utilize high-speed radio frequency access to communicate packets such as IP packets, for example those that communicate packets for the voice over IP (VoIP) Evolution-Data Optimized revision A (EVDOa) protocol, are also contemplated.

Wireless exchange unit 120 has an access point base transceiver station (BTS) 122 and an integrated application server 124. BTS 122 serves a dual purpose of transmitting a signal to impart information to wireless devices that it is available for communication and to receive requests from wireless devices. Access point BTS 122 in many ways is analogous to a "miniature" cellular phone tower and BTS, providing access to the telecommunications network through a standard protocol, such as the aforementioned CDMA2000. A primary difference is that access is on a much smaller scale and ultimately reaches the network through an Internet connection. One area in which an access point BTS is most helpful is in providing access for devices that are indoors. This is particularly true of devices within structures or at locations that do not readily receive wireless service from a traditional BTS and tower.

Integrated application server 124 has numerous components, not shown due to their nature as computer-readable media having computer-executable instructions. Server 124 includes a session proxy 126, an application server 128 and a voice application server 130. The session proxy directs sessions between the one or more wireless devices 110 and the wireless exchange unit 120. The application server provides communications features to the wireless devices and the voice application server administers access to those features by wireless devices. The interactions of these three components with wireless devices will be discussed in greater detail below.

As illustratively shown in FIG. 1, wireless exchange unit 120 is depicted as two pieces of hardware for BTS 122 and integrated application server 124. This is to denote the separate functions carried out by each component, however it is not intended to limit wireless exchange unit 120 to a composition of two units. To the contrary, in some embodiments it is contemplated that wireless unit 120 will consist of a single piece of hardware, as noted with the dashed lines around the individual components. Thus, the functions of BTS 122 and integrated application server 124 can be combined into an exchange unit in order to further reduce the technological overhead and space constraints required to couple and configure the unit.

Wireless exchange unit 120 is connected to the internet through a high-speed internet connection 150, such as one provided by a digital subscriber line (DSL) through an internet service provider (ISP). Other methods of high-speed internet connections fall within the scope of the claimed embodiments of the present invention, therefore the disclosure of DSL is not intended to limit the scope of the present claims. Internet connection 150 is capable of connecting wireless exchange unit 120 to a node on the overall telecommunications network. Wireless exchange unit 120 also is coupled to a premise local area network (LAN) 190, which allows application server 124 access to interact with other servers and computing devices as necessary. The connection of wireless exchange unit 120 and premise LAN 190 further integrates the functions of application server into the resources of other Internet Protocol services and includes the ability to bundle unit 120's capabilities into the enterprise's overall computing and software environment.

In the exemplary environment, internet connection 150 couples unit 120 and a regional datacenter 162. Telecommunications network environment 100 is further composed of one or more CDN distribution sites 170, an IP packet core 180, one or more mobile switching sites 182 and a switching system 7 (SS7) network 184, all of which are shown in FIG. 1 with various interconnections. The interconnection of datacenter 162, distribution site 170, IP packet core 180, mobile switching site 182 and SS7 network 184 are provided to show typical types of hardware, software, and connections made within environments in which the claimed embodiments of the present invention may be practiced. Finally, public switched telephone network (PSTN) 192 by way of premise local area network 190 is shown as an example of a back-up option available to integrated application server 124 when high-speed internet connection 150 is not accessible. The dotted line from network 192 to switching site 180 is used to denote the nature of the connection is not normally required for the system to function.

Figure 2:
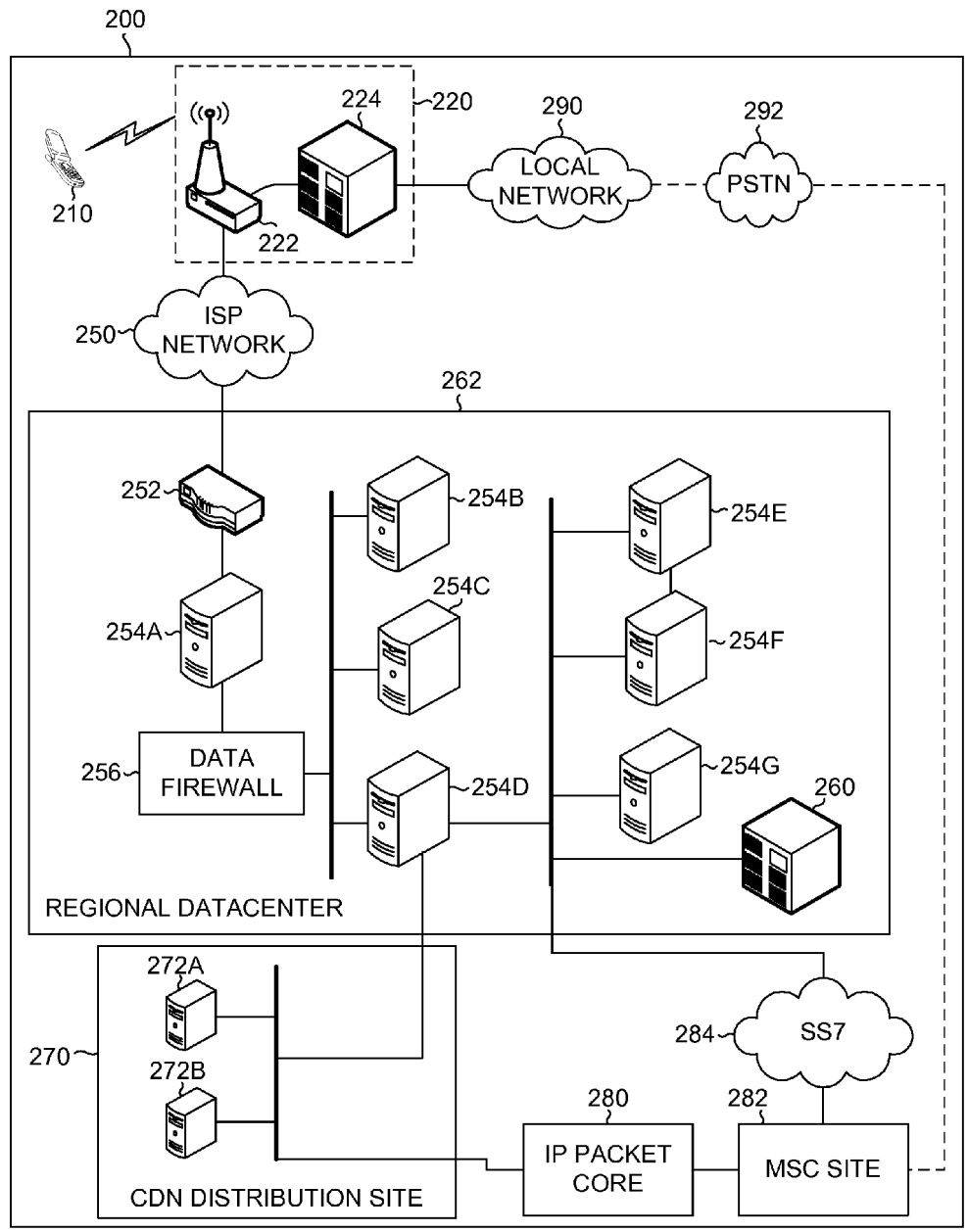
FIG. 2 is a more detailed exemplary wireless telecommunications environment suitable for practicing an embodiment of the present invention.

Turning now to FIG. 2, a more detailed version of an exemplary telecommunications environment 200 is given. Components that contain the same last two digits are understood to be analogous to corresponding components from earlier figures. Therefore, a wireless device 210 is understood to be similar or identical to wireless device 110 from the previous figure. As such, an internet connection 250, an IP packet core 280, a mobile switching site 282, an SS7 network 284, a premise LAN 290, and a PSTN 292 will not be discussed in further detail as they are similar to the features discussed in FIG. 1. A CDN distribution site 270 is only shown in greater detail as to understand that site 270 further contains components and servers, shown in the figure as 272A and 272B. There is not necessarily a limitation of two servers at site 270, and the servers depicted are intended to be exemplary in nature only.

Continuing with FIG. 2, a regional datacenter 262, is made up of a number of servers of similar or differing types labeled servers 254A-254G. The servers depicted are once again exemplary in nature and not considered within the scope of the claimed embodiments of the present invention. The servers can take a number of forms, use varied protocols, and perform numerous functions. For example, server 254A can be a virtual private network (VPN) gateway. However, server 254A need not be any particular server. Also a part of the data center can be a router 252 and a data firewall 256. Again, the interoperability of these components is conventional in nature and allows telecommunications network 200 to function properly, but is not intended to provide limitation to the makeup, configuration, or operation of network 200.

FIG. 2 depicts a network application server 260, which communicates through internet connection 250. Network application server 260 provides call features for devices on telecommunications network 200. This is a mated server which can provide a number of the functions also supplied by application server 224, albeit in a more limited fashion. In the event of an outage at wireless exchange unit 220, network application server 260 can provide disaster recovery by serving as a proxy device for server 224. In one embodiment of the present invention, network application server 260 sends call features to the application server component of server 224. In other embodiments, network application server 260 provides call features to wireless device 210 even when device 210 is not in contact with exchange unit 220, but is accessing telecommunications network 200 from another access point, i.e., from a conventional tower and BTS.

Figure 3A:
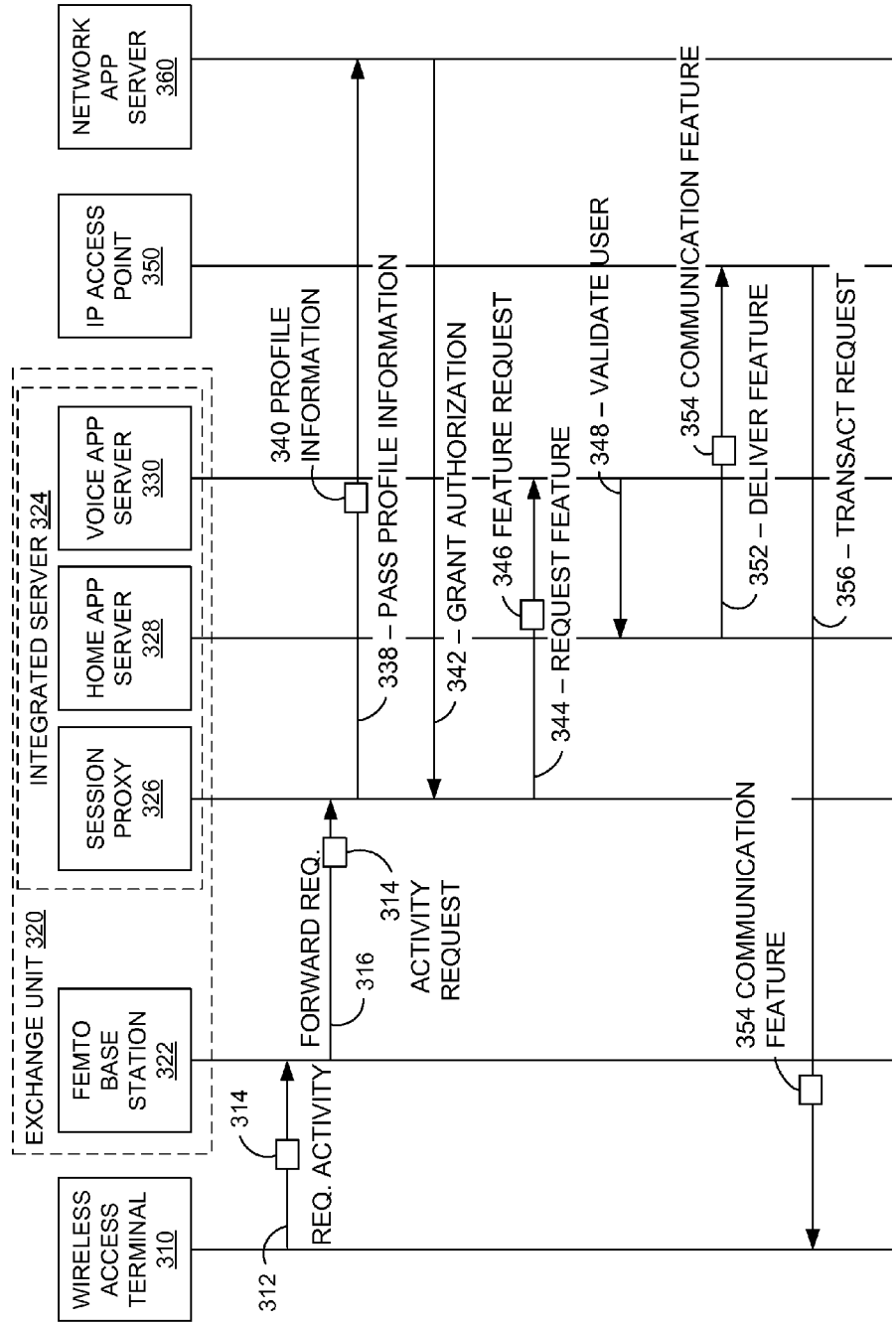
FIG. 3A is a method by which the present invention may be used in order for the telecommunications network to provide enhanced features when the wireless user is within range of the wireless exchange unit.

As shown in FIG. 3A. through one embodiment, there are a number of ways that wireless exchange unit 320 can be used to provide enhanced telecommunications features to wireless device(s) 110. Using this exemplary method, at a step 312 a wireless access terminal 310 sends an activity request 314 to a BTS 322, which is, of course, a part of a wireless exchange unit 320. At a step 316, BTS 322 forwards request 314 to a session proxy component 326 of integrated application server 324. Session proxy 326 forwards a profile information 340 to a network application server 360 at a step 338. If the device receives a request from a device with proper authority, Network application server 360 grants network authorization at a step 342. At a step 344, session proxy 326 sends a feature request 346 that is shown with the numeral 346. The user is validated by a voice application server 330 component of integrated application server 324 in order to complete a step 348. A communication feature, numbered 354, is delivered from a home application server component 328 to an IP access point 350. Access point 350 then sends communication feature 354 to wireless access device 310. In an embodiment, a connection to the wireless access device 310 fails or is unable to be completed. As a result, in an embodiment, an electronic mail (email) notification is transmitted to an email address associated with the wireless access device 310 associated with the wireless exchange unit 320. In another embodiment, a connection request to a first wireless device 310 associated with the wireless exchange unit 320 is forwarded to a second wireless access device 310 associated with the wireless exchange unit 320. In yet another embodiment, when the connection to the first wireless access device 310 is not completed, the connection request is forwarded to a telecommunications access point, such as the network application server 360.

Figure 3B:
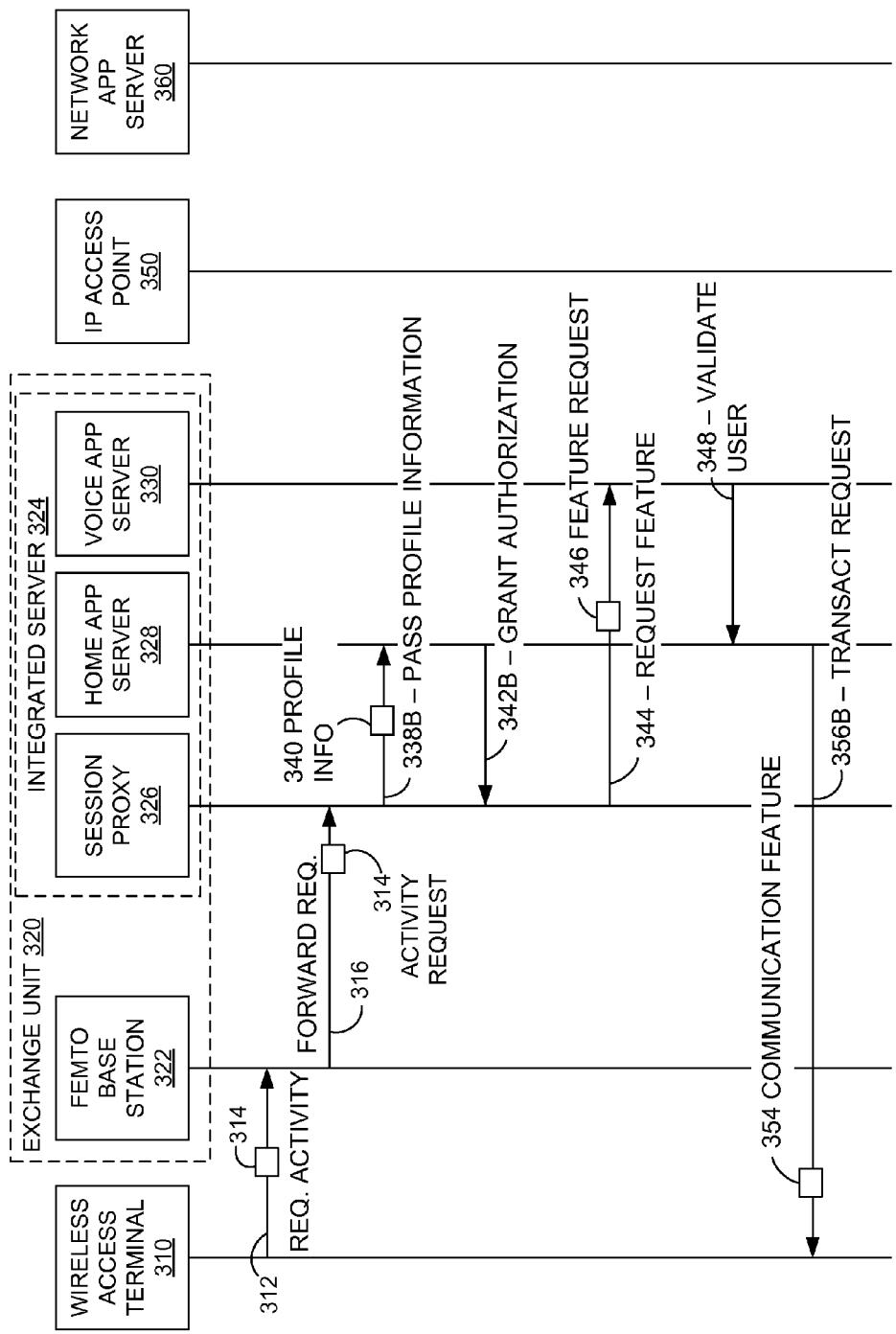
FIG. 3B is a method by which the present invention may be used in order for the wireless exchange unit to provide enhanced telecommunications features when the wireless user is not within range of the unit.

Another method with which the present invention may be practiced is shown in FIG. 3B. The method is similar to the previously described method of FIG. 3A, so identical steps and information are numbered in the same manner. The alteration of this method is the reliance on home application server 328, rather than connecting to the greater telecommunications network through access point 350. Rather than involve network resources, a step 338B passes profile information to home application server 328, which grants authorization at a step 342B. Without the need for network resources, step 352 of FIG. 3A is not needed to communicate feature 354 to access point 350. Rather, at a step 356B, the method becomes more efficient by simply transacting the request at home application server 328.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of improving communication between a telecommunications network and a wireless device by utilizing a wireless exchange unit that includes an access-point base transceiver station ("BTS") and an integrated server, the wireless exchange unit operating as an access point to the telecommunications network, the wireless device being capable of wirelessly communicating with the wireless exchange unit, the method comprising:

communicatively coupling the wireless exchange unit to a premise local area network (LAN) thereby integrating one or more functions of the server of the wireless exchange unit with resources of one or more computing devices on the local area network, the premise LAN being disposed within the premises of an enterprise location;

at the access-point BTS, receiving enhanced network connection requests that require TDMA, SIP, or IPPBX compliance from the wireless device that is not TDMA, SIP, or IPPBX compliant;

authenticating the wireless device to the telecommunications network so that that the wireless device can communicate data via said telecommunications network;

establishing a communications session ("session") between the wireless exchange unit and the wireless device;

logically coupling the wireless exchange unit to a node on the telecommunications network via a high-speed internet connection by way of systems of an internet service provider; and providing the enhanced network connection to the wireless device by way of said logical coupling, the wireless exchange unit enabling provision of the enhanced connection to the wireless device.

2. The media of claim 1, wherein providing the enhanced network connection is provided by an application server at the wireless exchange unit.

3. The media of claim 1, wherein providing the enhanced network connection couples a first wireless access device associated with the wireless exchange unit to a second wireless access device associated with the wireless exchange unit utilizing only the wireless exchange unit to the exclusion of other resources of the telecommunications network.

4. The media of claim 1, wherein providing the enhanced network connection is provided by an application server on the telecommunications network further connected through the application server at the wireless exchange unit.

5. The media of claim 1, wherein providing the enhanced network connection couples a first wireless access device associated with the wireless exchange unit to a second wireless access device associated with the wireless exchange unit utilizing at least one access point of the telecommunication network other than the exchange unit and the high-speed Internet connection.

6. The media of claim 1, wherein providing the enhanced network connection couples a first wireless access device associated with the wireless exchange unit to a voice message application associated with the wireless exchange unit utilizing only the wireless exchange unit and utilizing no additional resources of the telecommunications network.

7. The media of claim 1, wherein providing the enhanced network connection transmits an electronic mail notification to an electronic mail address associated with a wireless access device associated with the wireless exchange unit in the event a connection to the wireless access device is not completed.

8. The media of claim 1, wherein the enhanced network connection forwards a connection request to a first wireless access device associated with the wireless exchange unit to a second wireless access device associated with the wireless exchange unit in the event the first wireless access device does not complete the connection.

9. The media of claim 1, wherein providing the enhanced network connection forwards a connection request to a first wireless access device associated with the wireless exchange unit to a telecommunications access point in the event the connection to the first wireless access device is not completed.

10. The media of claim 1, wherein logically coupling further includes logically coupling the wireless exchange unit to the internet through a connection via a conventional telecommunications connection in the event the high-speed connection is unavailable.

11. One or more non-transitory computer-readable media having computer-executable instructions embodied thereon for performing a method of communicatively coupling one or more wireless access terminals to a wireless exchange unit that includes an access point base transceiver station (BTS) and an integrated server, wherein the integrated server includes a session proxy, a home application server and a voice application server, the wireless exchange unit operating as an access point to a telecommunications network via a high-speed Internet connection therebetween, the high-speed Internet connection being provided by an Internet service provider, and the one or more wireless access terminals capable of communicating wirelessly with the wireless exchange unit, the method comprising:

communicatively coupling the wireless exchange unit to a premise local area network (LAN) thereby enabling integration of one or more functions of the integrated server of the wireless exchange unit with resources of one or more computing devices on the premise LAN, the premise LAN being disposed within the premises of an enterprise location;

receiving an activity request from a first wireless access terminal, that is not TDMA, SIP, or IPPBX compliant, of the one or more wireless access terminals at a receiving component of the access point BTS;

forwarding the activity request to the session proxy component of the wireless exchange unit;

providing information associated with the first wireless access terminal to an authentication component of the wireless exchange unit in order to authenticate the first wireless access terminal;

authenticating, by the authentication component, the first wireless access terminal based upon the information provided by the session proxy;

the session proxy presenting one or more feature requests to the voice application server for one or more enhanced communication features, wherein the enhanced communication features require TDMA, SIP, or IPPBX compliance;

the voice application server confirming that the first wireless access terminal is authorized to request the one or more enhanced communication features; and the home application server delivering the one or more requested enhanced communication features to the first wireless access terminal.

12. The media of claim 11, wherein a second requested enhanced communication feature is first provided by an application server on the telecommunications network to the home application server at the wireless exchange unit via the high-speed Internet connection and then the second requested enhanced communication feature is provided by the home application server at the wireless exchange unit to the one or more wireless devices.

13. The media of claim 11, wherein the one or more requested enhanced communication features includes forwarding a connection request to the first wireless access device associated with the wireless exchange unit to a telecommunications access point via the high-speed Internet connection in the event the first wireless access device does not complete the connection.

14. A method of improving communication between a telecommunications network and one or more wireless devices by utilizing a wireless exchange unit that is not in direct communication with a node on the telecommunications network and includes an access-point base transceiver station ("BTS") and an integrated server, wherein the integrated server further includes an application server and a voice application server, the wireless exchange unit operating as an access point to the telecommunications network, the one or more wireless devices being capable of wirelessly communicating with the wireless exchange unit, the method comprising:

communicatively coupling the wireless exchange unit to a node on the telecommunications network via a high-speed connection to the Internet by way of systems of an internet service provider;

receiving at the wireless exchange unit one or more respective unique identifiers associated with the one or more wireless devices, the respective identifiers indicating that the one or more wireless devices are authorized to wirelessly communicate with the wireless exchange unit;

transmitting from the wireless exchange unit a signal indicating to the one or more wireless devices that the wireless exchange unit is capable of wirelessly communicating with the one or more wireless devices;

receiving a request for a communication feature that requires TDMA, SIP, or IPPBX compliance from a first wireless device, that is not TDMA, SIP, or IPPBX compliant, of the one or more wireless devices;

communicating, internally to the wireless exchange unit, the request for connection features from the voice application server of the wireless exchange unit to a server of the wireless exchange unit capable of providing the connection features from the BTS to the integrated server, wherein the connection features are available only to the one or more wireless devices; and providing, by the wireless exchange unit using the high-speed connection to the Internet, the communication feature to the first wireless device.

15. The media of claim 14, wherein one or more additional communication features are provided at least in part by an application server on the telecommunications network.

16. The media of claim 15, wherein the additional communication features include forwarding a connection request to a first wireless access device associated with the wireless exchange unit to a telecommunications access point via the high-speed Internet connection in the event the connection to the first wireless access device is not completed.

17. The media of claim 14, wherein the communication features include connecting a first wireless access device associated with the wireless exchange unit to a second wireless access device associated with the wireless exchange unit using a service that is not directly compatible with the first or second wireless device.

\* \* \* \* \*